United States Patent
Parrish et al.

(10) Patent No.: US 6,425,009 B1
(45) Date of Patent: Jul. 23, 2002

(54) MONITORING REDUNDANT CONTROL BUSES TO PROVIDE A HIGH AVAILABILITY LOCAL AREA NETWORK FOR A TELECOMMUNICATIONS DEVICE

(75) Inventors: Brent K. Parrish, Hollis; Ronald A. McCracken, Pelham; John J. Fernald, Nashua, all of NH (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/328,038

(22) Filed: Jun. 8, 1999

(51) Int. Cl.[7] .................. G06F 15/173; H04Q 11/00; H04L 12/437
(52) U.S. Cl. ............... 709/224; 370/216; 370/257; 370/264; 370/438
(58) Field of Search ................. 370/219, 216, 370/217, 221, 245, 364, 438, 257; 709/224

(56) References Cited

U.S. PATENT DOCUMENTS

| | | | |
|---|---|---|---|
| 4,847,837 A | * 7/1989 | Morales et al. | 714/4 |
| 4,964,120 A | * 10/1990 | Mostashari | 370/228 |
| 5,016,244 A | * 5/1991 | Massey, Jr. et al. | 370/16 |
| 5,519,704 A | 5/1996 | Farinacci et al. | 370/85.13 |
| 5,544,310 A | * 8/1996 | Forman et al. | 714/31 |
| 5,596,569 A | * 1/1997 | Madonna et al. | 370/217 |
| 5,781,715 A | * 7/1998 | Sheu | 714/4 |
| 5,787,070 A | 7/1998 | Gupta et al. | 370/217 |
| 5,835,481 A | 11/1998 | Akyol et al. | 370/216 |
| 5,859,959 A | * 1/1999 | Kimball et al. | 395/182.02 |
| 5,923,643 A | * 7/1999 | Higgins et al. | 370/218 |
| 6,005,841 A | * 12/1999 | Kicklighter | 370/217 |
| 6,131,169 A | * 10/2000 | Okazawa et al. | 714/7 |

* cited by examiner

Primary Examiner—Krisna Lim
(74) Attorney, Agent, or Firm—Baker Botts L.L.P.

(57) ABSTRACT

A telecommunications device includes a local area network with redundant first and second buses. Multiple cards coupled to the first and second buses communicate using the first bus. A first monitor coupled to the first and second buses detects a failure of the first bus and communicates a message indicating the failure using a data network. A second monitor also coupled to the first and second buses may detect the failure of the first bus and may also communicate a message indicating the failure using the data network. The first monitor and the second monitor may receive the messages from one another and cause the cards to communicate using the second bus. In a more particular embodiment, the second monitor transmits a test signal using the first bus in response to the message from the first monitor.

22 Claims, 8 Drawing Sheets

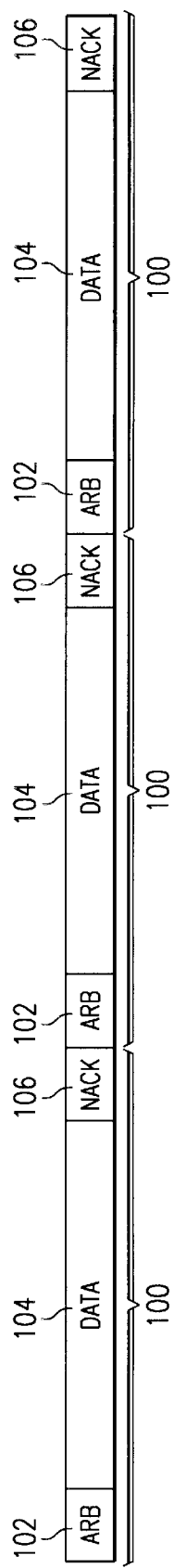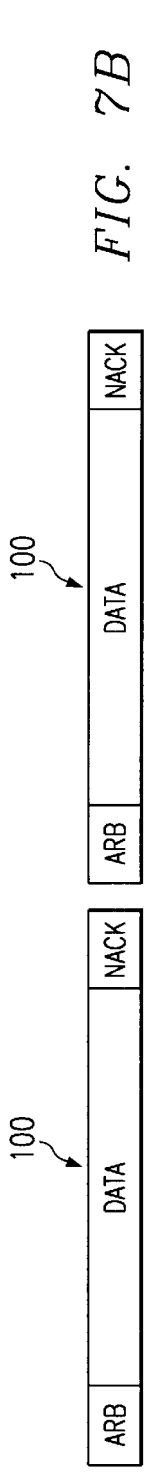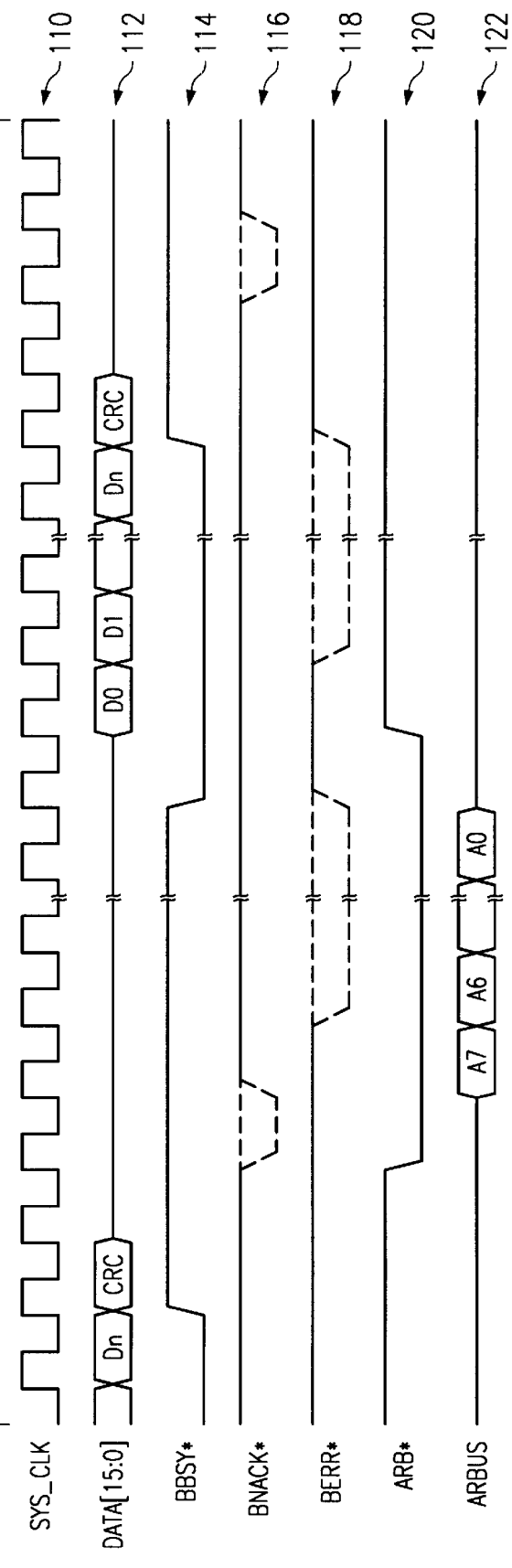

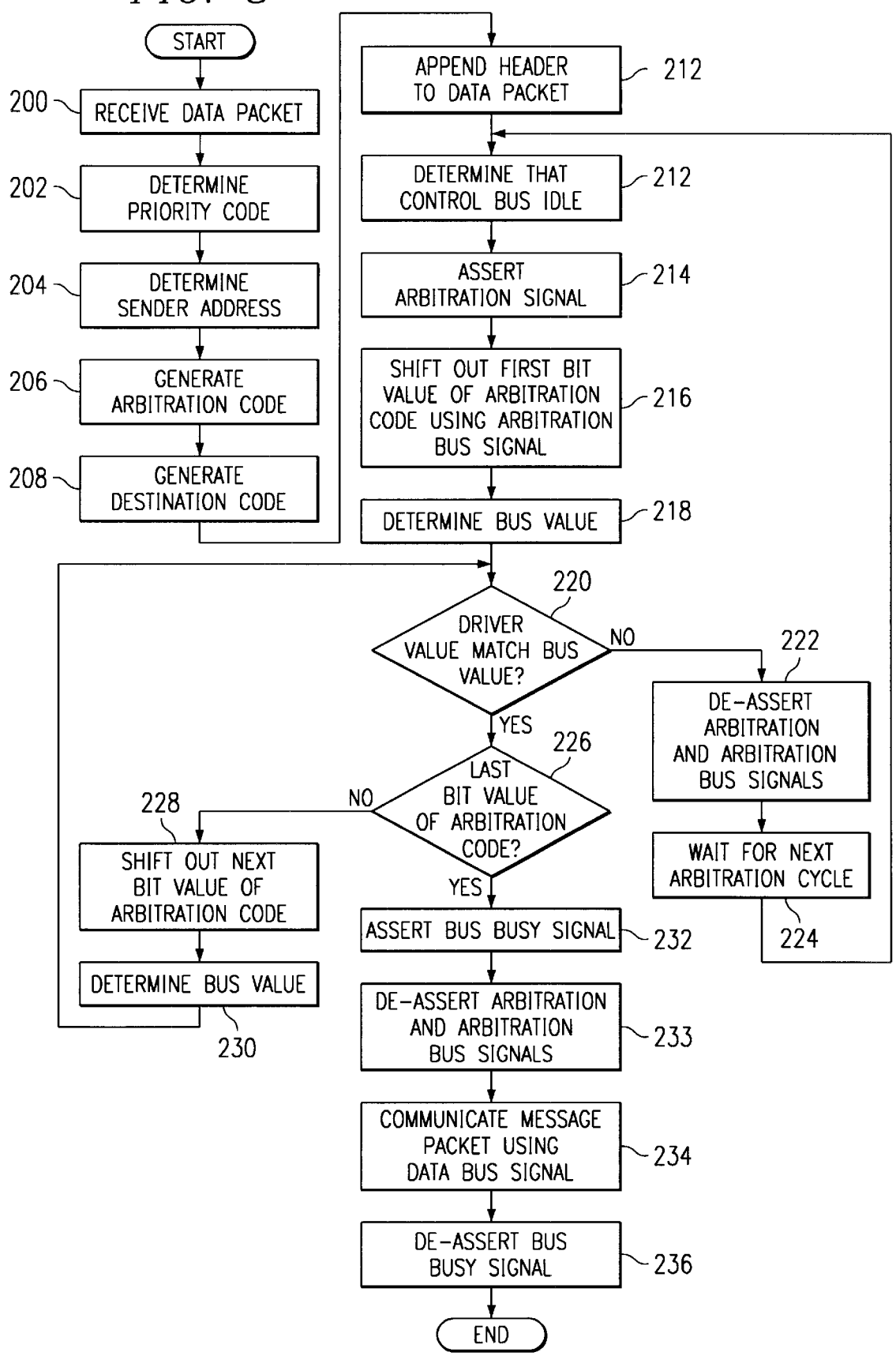

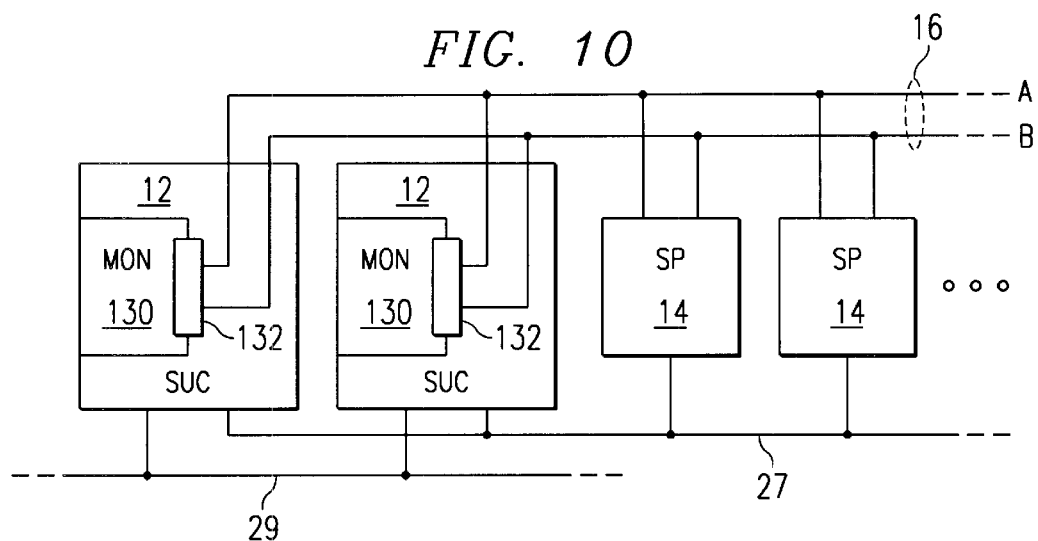
FIG. 10
FIG. 12
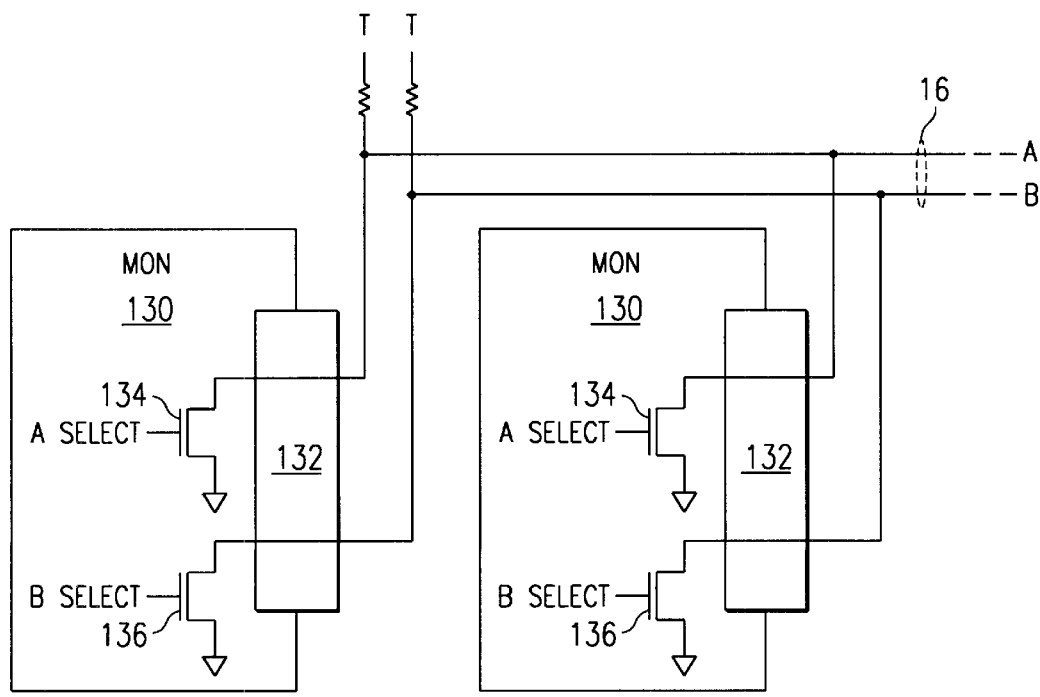
FIG. 11

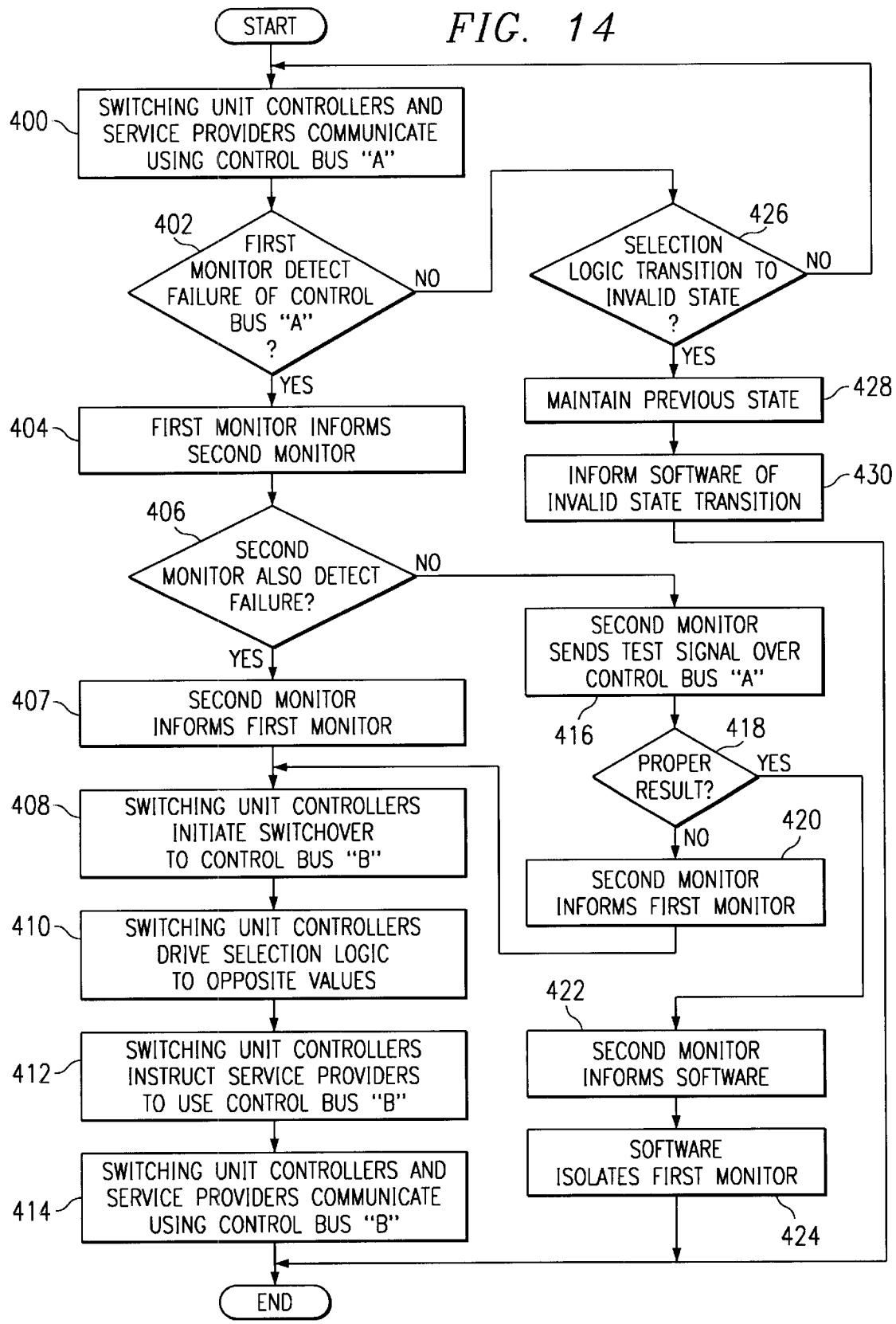

MONITORING REDUNDANT CONTROL BUSES TO PROVIDE A HIGH AVAILABILITY LOCAL AREA NETWORK FOR A TELECOMMUNICATIONS DEVICE

RELATED APPLICATIONS

This application is related to:

U.S. application Ser. No. 09/328,171 for a "LOCAL AREA NETWORK AND MESSAGE PACKET FOR A TELECOMMUNICATIONS DEVICE," filed Jun. 8, 1999 by Brent K. Parrish, Christopher A. Meltildi, John P. Barry, and Lee C. Stevens;

U.S. application Ser. No. 09/327,700 for a "TDM SWITCHING SYSTEM AND ASIC DEVICE," filed Jun. 8, 1999 by Brent K. Parrish and Werner E. Niebel;

U.S. application Ser. No. 09/327,971 for a "PROTECTION BUS AND METHOD FOR A TELECOMMUNICATIONS DEVICE," filed Jun. 8, 1999 by Brent K. Parrish and John P. Barry;

U.S. application Ser. No. 09/328,173 for a "EVENT INITIATION BUS AND ASSOCIATED FAULT PROTECTION FOR A TELECOMMUNICATIONS DEVICE," filed Jun. 8, 1999 by Brent K. Parrish, Ronald A. McCracken, and John J. Fernald;

U.S. application Ser. No. 09/328,031 for a "FRAME SYNCHRONIZATION AND FAULT PROTECTION FOR A TELECOMMUNICATIONS DEVICE," filed Jun. 8, 1999 by Brent K. Parrish;

U.S. application Ser. No. 09/328,172 for a "TRANSITIONING A STANDARDS-BASED CARD INTO A HIGH AVAILABILITY BACKPLANE ENVIRONMENT," filed Jun. 8, 1999 by Brent K. Parrish, Michael J. Taylor, and Michael P. Colton; and U.S. application Ser. No. 09/330,433 for a "CLOCK SYNCHRONIZATION AND FAULT PROTECTION FOR A TELECOMMUNICATIONS DEVICE," filed Jun. 8, 1999 by Brent Parrish.

TECHNICAL FIELD OF THE INVENTION

This invention relates to the field of telecommunications, and more particularly to a high availability local area network for a telecommunications device.

BACKGROUND OF THE INVENTION

Many telecommunications devices include backplanes for transmitting digital information between components of the devices. For example, a telecommunications switching system might include a backplane for transmitting digital data representing voice signals between cards associated with incoming and outgoing ports. Typically, such a system would also include a mechanism to allow these cards to communicate with one another and to receive command, control, and administrative information from other components during operation of the system. Successful operation of the system in many instances depends heavily upon the ability of this communications mechanism to meet the often stringent availability, bandwidth, flexibility, and other requirements placed on the system.

As the telecommunications industry continues to dominate the growth of the global economy, meeting availability, bandwidth, flexibility, and other requirements placed on switching and other telecommunications systems has become increasingly important. However, previous communications mechanisms are inadequate to satisfy requirements placed on many systems, particularly those mechanisms intended for use within high availability backplane environments. A failure of such a communications mechanism or of a component intended to detect and handle faults associated with the communications mechanism may result in an very undesirable failure of the system as a whole. High availability may generally be considered as exceeding 99.999 percent availability, amounting to approximately five minutes or less of "down time" each year. To achieve high availability, a system must generally be able to autonomously detect and handle certain faults, such as the failure of a card, without requiring immediate human intervention. Previous communications mechanisms often do not adequately meet this requirement. These and other deficiencies make such mechanisms inadequate within a high availability backplane environment of a telecommunications device.

SUMMARY OF THE INVENTION

According to the present invention, disadvantages and problems associated with communications in high availability backplane environments of telecommunications devices have been substantially reduced or eliminated.

According to one embodiment of the present invention, a telecommunications device includes a local area network with redundant first and second buses. Multiple cards coupled to the first and second buses communicate using the first bus. A first monitor coupled to the first and second buses detects a failure of the first bus and communicates a message indicating the failure using a data network. A second monitor coupled to the first and second buses may detect the failure of the first bus and may also communicate a message indicating the failure using the data network. If the first and second monitors receive the messages, the monitors cause the cards to communicate using the second bus. In other embodiments, the second monitor transmits a test signal using the first bus in response to the message from the first monitor if the second monitor has not detected the failure of the first bus. The second monitor may communicate the message to the first monitor in response to an improper test signal result, and the device may isolate the first monitor in response to a proper test signal result.

The local area network of the present invention provides a number of important technical advantages over previous communications mechanisms, particularly within a high availability backplane environment of a telecommunications device. The present invention provides multiple layers of fault protection, including both fault detection and autonomous fault handling, helping to avoid single points of failure, reduce down time, and satisfy high availability requirements. As a result of these and other advantages, the local area network of the present invention is well suited for incorporation in a wide variety of switching and other modern telecommunications devices. Other important technical advantages are apparent to those skilled in the art.

BRIEF DESCRIPTION OF THE DRAWINGS

To provide a more complete understanding of the present invention and further features and advantages thereof, reference is now made to the following description taken in conjunction with the accompanying drawings, in which:

FIGS. 7A and 7B illustrate exemplary transfer cycles according to the present invention;

FIG. 8 is a flow chart illustrating an exemplary method of communicating a message packet according to the present invention;

FIG. 10 illustrates exemplary control bus monitors and selected related components according to the present invention;

FIG. 11 illustrates in further detail exemplary control bus monitors according to the present invention;

FIG. 12 illustrates an exemplary control bus selection state table according to the present invention;

FIG. 14 is a flow chart illustrating an exemplary method of monitoring a local area network according to the present invention.

DETAILED DESCRIPTION OF THE INVENTION

Figure 1:
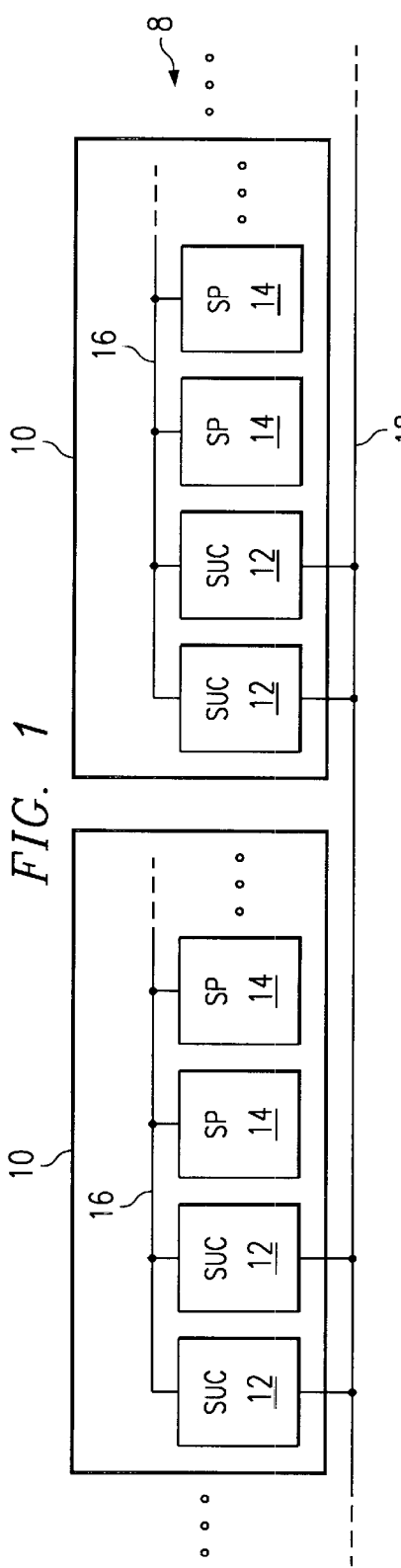
FIG. 1 illustrates an exemplary system including multiple switching units each having a local area network according to the present invention.

FIG. 1 illustrates an exemplary system 8 including one or more switching units 10. In one embodiment, each switching unit 10 is a programmable switching unit that switches time division multiplexed (TDM), packet-based, or other suitable digital signals associated with voice, data, or other appropriate traffic between incoming and outgoing ports, lines, trunks, or other suitable telecommunications network interfaces. In general, each switching unit 10 may operate at least in part subject to the control of suitable software within one or more associated host computers and may be coupled to such host computers using one or more suitable communications links. Although switching units 10 are discussed, those skilled in the art appreciate that the present invention may apply similarly to a wide variety of other telecommunications devices and that the present invention is intended to encompass all such applications.

In one embodiment, each switching unit 10 includes two or more redundant switching unit controllers (SUC) 12 coupled to one another and to multiple service providers (SP) 14 using a control bus 16. Switching unit controllers 12 and service providers 14 are cards that support appropriate integrated circuits, buses, circuitry, and any other suitable electrical components and may be shelf-mounted, rack-mounted, or otherwise removably installed within switching unit 10 according to particular needs. Switching unit controllers 12 generally control higher level aspects of the operation of service providers 14 and other components of switching unit 10. Service providers 14 generally communicate between a backplane, midplane, or other switching fabric of switching unit 10 and one or more telecommunications network interfaces to allow switching unit 10 to communicate information with, and to switch the digital signals associated with, corresponding networks. Service providers 14 may communicate with network interfaces of a single or multiple types within a particular switching unit 10, for example and not by way of limitation, T1 interfaces, E1 interfaces, Integrated Services Digital Network (ISDN) interfaces, Signaling System 7 (SS7) interfaces, Optical Carrier level-3 (OC-3), or any other suitable network interfaces, in any combination. Switching unit controllers 12 and service providers 14 may be hot insertable, hot pluggable, hot swappable, or otherwise readily replaceable during operation of switching unit 10 to support high availability requirements. Service providers 14 are referred to generally, according to the scope of the present invention, as cards 14.

In general, switching unit controllers 12 and service providers 14 use control bus 16 to communicate suitable command, control, and administrative messages with one another during operation of switching unit 10. Control bus 16 and its associated physical layer protocol provide a local area network coupling switching unit controllers 12 and service providers 14 within a high availability backplane environment of switching unit 10. Switching unit controllers 12 and service providers 14 may have a peer-to-peer relationship, such that all cards are at the same level with respect to control bus 16 and any card is permitted to initiate a message transfer, or may have a suitable hierarchical relationship, such that at least some cards are at different levels with respect to control bus 16 and one or more cards may be prevented or otherwise inhibited from initiating message transfers. In a particular embodiment, control bus 16 provides a 16 bit wide parallel transmission path with synchronous transfers at 8 MHz, yielding a full bus bandwidth of 128 Mbps. Those skilled in the art appreciate that control bus 16 may have any suitable width, clock rate, and bandwidth without departing from the intended scope of the present invention.

One or more switching unit controllers 12 within a particular switching unit 10 may be coupled using network 18 to one or more switching unit controllers 12 within other switching units 10, one or more associated host computers, or one or more other network components, in any suitable combination. Network 18 may be a shared or dedicated local area network (LAN) supporting Ethernet or any other communications protocol, a suitable wide area network (WAN), or any other appropriate network. In one embodiment, network 18 supports a secure 100BaseT Ethernet link and one or more higher level protocols, for example, TCP/IP (Transmission Control Protocol/Internet Protocol), UDP/IP (User Datagram Protocol/Internet Protocol), or any other suitable protocol. A service provider 14 needing to communicate with a service provider 14 located in another switching unit 10 does so using one of its associated switching unit controllers 12 as a gateway to network 18. Switching unit controller 12 will collect and buffer message packets from service provider 14, reformat the message packets as appropriate, and transmit the message packets to a switching unit controller 12 in the switching unit 10 associated with the destination service provider 14.

Figure 2:
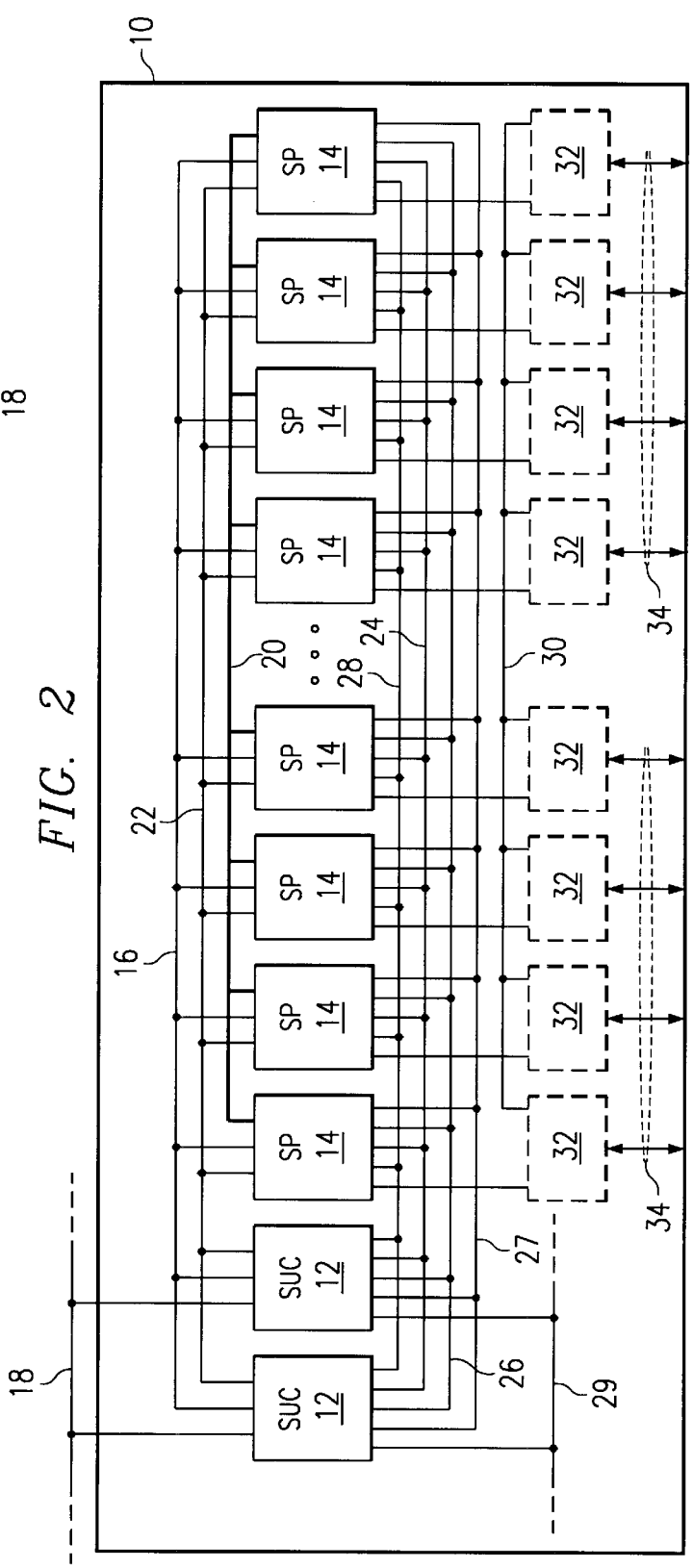
FIG. 2 illustrates in further detail an exemplary local area network and other components within a switching unit according to the present invention.

FIG. 2 illustrates in further detail the components of switching unit 10. Service providers 14 communicate digital signals with each other using a backplane 20 that in a particular embodiment supports up to 16,384 time slots, corresponding to as many as 16,384 ports. In addition to control bus 16, switching unit controllers 12 and service providers 14 may be coupled to one another using a suitable combination of synchronization bus 22, power bus 24, reset bus 26, isolation bus 27, selection bus 28, and any other suitable buses according to particular needs. In one embodiment, at least one input/output (I/O) module 32 is associated with each service provider 14 to support incoming and outgoing communications between service provider 14 and an associated network interface over associated link 34. A protection bus 30 couples I/O modules 32 and generally operates with control bus 16 and its associated physical layer protocol to provide protection switching and other capabilities desirable in avoiding a single point of failure and satisfying high availability requirements. Protection bus 30 is described more fully below with reference to FIG. 6 and also in copending U.S. application Ser. No. 09/327,971.

An Ethernet or other suitable internal data network 29 couples switching unit controllers 12. In one embodiment, to avoid a single point of failure and help support high availability requirements, switching unit 10 may include redundant "A" and "B" control buses 16. Monitoring of control bus 16 and the selection of a particular "A" or "B" control bus 16 for communication of a particular message may be performed more or less continuously in operation of switching unit 10 using one or more control bus monitors within switching unit controllers 12, using selection bus 28, and using data network 29. The operation of the control bus monitors, selection bus 28, and data network 29 with respect to monitoring control bus 16 and protecting switching unit 10 from faults associated with control bus 16 is described more fully below with reference to FIGS. 10 through 14.

Figure 3:
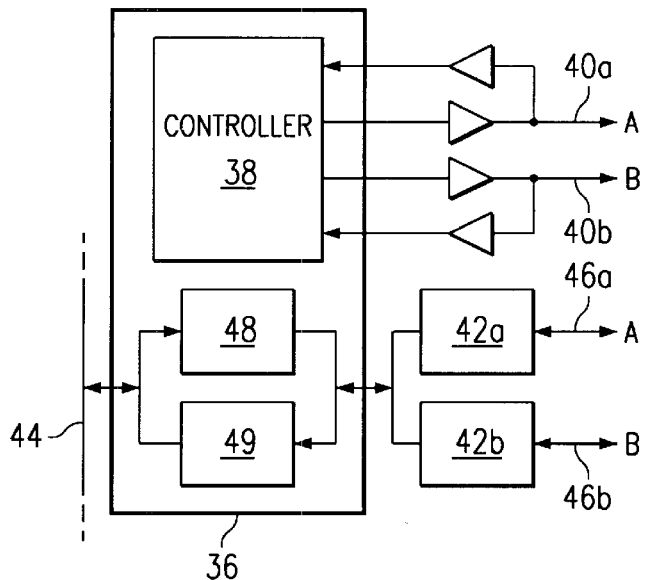
FIG. 3 illustrates an exemplary control bus core according to the present invention.

FIG. 3 illustrates an exemplary control bus core 36 that is located on each card within switching unit 10. Control bus core 36 includes a controller 38 supporting control bus logic and suitable to implement appropriate portions of the physical layer protocol associated with control bus 16. In one embodiment, controller 38 is coupled to control bus 16 using control links 40a and 40b corresponding to the redundant "A" and "B" control buses 16, respectively. Data is transmitted between a PCI or other suitable bus 44, transmit buffer 48 or receive buffer 49 as appropriate, transceivers 42a and 42b, and data links 46a and 46b corresponding to redundant "A" and "B" control buses 16, respectively. Such data may include suitable command, control, and administrative data related to timing and synchronization, arbitration, error handling, or any other appropriate data. Where control bus core 36 is located on a switching unit controller 12, controller 38 may support an associated control bus monitor, although the present invention contemplates one or more control bus monitors being at any suitable locations.

In one embodiment, redundancy in connection with control bus 16 may apply to the physical transport media but not necessarily to the link layer and physical control devices. For example, as shown in FIG. 3, a single controller 38 may be used in connection with duplicate control links 40a and 40b, duplicate data links 42a and 42b, and a transmission path through transmit buffer 48 and receive buffer 49 to support redundant "A" and "B" control buses 16. In response to a failure, controller 38 and the control of transmit and receive buffers 48 and 49, respectively, may be electrically isolated from other switching unit controllers 12 and service providers 14 according to a suitable isolation technique involving isolation bus 27 or otherwise. This helps to prevent a single point of failure from propagating within system 8 and helps to satisfy high availability requirements. Suitable isolation techniques involving isolation bus 27 are described more fully in copending U.S. application Ser. No. 09/328,172.

Figure 4:
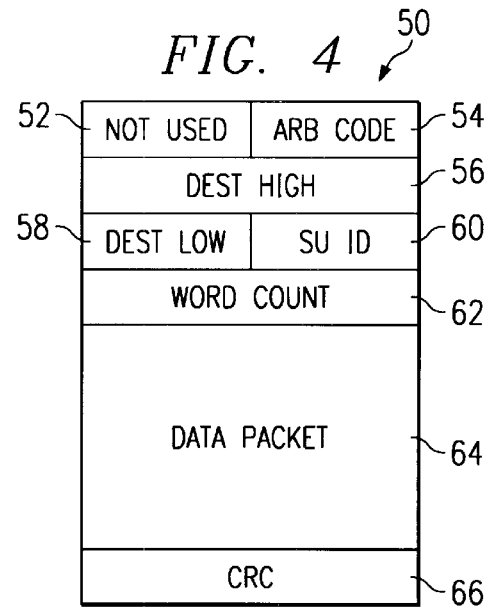
FIG. 4 illustrates an exemplary message packet structure according to the present invention.

FIG. 4 illustrates an exemplary structure for message packet 50. Message packet 50 is communicated from a sender, which may be any switching unit controller 12 or service provider 14, to a receiver, which may be any other switching unit controller 12 or service provider 14, using control bus 16. In one embodiment, message packet 50 implements a physical layer protocol that supports one or more higher level protocol layers. Using TCP/IP communications as an example only, and not by way of limitation, message packet 50 may support an application layer data packet, a TCP layer message packet containing the application layer data packet and an appended TCP header, an IP layer message packet containing the TCP layer message packet as the IP layer data packet and an appended IP header, and a transport layer message packet containing the IP layer message packet as the transport layer data packet and an appended transport header. As described more fully below, such a transport layer message packet may be incorporated into message packet 50 as data packet 64.

In one embodiment, message packet 50 may include, without limitation and in any suitable combination: (1) a word containing an eight bit unused block 52 and an eight bit arbitration code 54, (2) a sixteen bit destination high word 56, (3) a word containing an eight bit destination low block 58 and an eight bit switching unit identifier 60, (4) a sixteen bit word count word 62, (5) a sixteen bit wide data packet 64 of appropriate length, and (6) a sixteen bit cyclic redundancy check (CRC) word 66. As discussed above, control bus 16 may have any suitable bit width without departing from the intended scope of the present invention. Furthermore, one or more additional portions may be appended to message packet 50, appropriate portions of message packet 50 may be rearranged relative to one another, and one or more suitable portions of message packet 50 may be enlarged, reduced, or eliminated according to particular needs. For example, one or more additional header words of appropriate size may be appended to or otherwise included in message packet 50, in previously unused block 52 for example, to help facilitate communications between cards in different switching units 10 using network 18.

In one embodiment, where message packet 50 is a physical layer message packet, data packet 64 includes at least a transport layer message packet. A suitable driver responsible for linking higher level protocol layers with the physical layer appends a header to data packet 64 that may include unused block 52, arbitration code 54, a destination code containing destination high word 56 and destination low block 58, switching unit identifier 60, and word count word 62. Arbitration code 54 is discussed more fully below with reference to FIGS. 5A and 5B. The destination code containing destination high word 56 and destination low block 58 is discussed more fully below with reference to FIG. 6. Those skilled in the art appreciate that reference herein to communication of message packet 50 is intended to include communication of message packet 50 as a whole or, where appropriate, in any suitable part. For example and not by way of limitation, a sender may communicate to a receiver the portion of message packet 50 containing data packet 64 but may not communicate to the receiver arbitration code 54.

Switching unit identifier 60 is used for communicating data packet 64 to a switching unit controller 12 or service provider 14 within another switching unit 10. Switching unit identifier 60 may have bit positions that each correspond to a particular switching unit 10 and are each given a "0" or "1" bit value depending on whether the associated switching unit 10 is to receive data packet 64. Alternatively, switching unit identifier 60 may identify each particular switching unit 10 according to a particular series of bit values spanning multiple bit positions. Once switching unit identifier 60 is activated in some suitable manner to indicate that communication of data packet 64 to one or more other switching units 10 is desired, the switching unit controller 12 within the same switching unit 10 as the sender collects message packet 50, including data packet 64, and acts as a gateway to communicate message packet 50 to the identified switching units 10 using network 18. A switching unit controller 12 within a receiving switching unit 10 then acts as a gateway to distribute message packet 50 within the receiving switching unit 10. In one embodiment, the sender may direct data packet 64 to a particular switching unit controller 12 within the receiving switching unit 10, and data packet 64 may be distributed to one or more cards within the receiving switching unit 10, according to the destination code as discussed more fully below with reference to FIG. 6.

Word count word 62 identifies the number of words or bytes within data packet 64 and allows one or more receivers to determine if any framing error has occurred during the communication of data packet 64 over control bus 16. One or more other suitable portions of message packet 50 may also checked. In one embodiment, each receiver of message packet 50 maintains a record of the number of words it receives. When message packet 50 has been completely transferred, the receiver compares the number of words it received to word count word 62. A mismatch indicates a framing error. A receiver discovering a framing error will inform at least the sender of message packet 50 of the framing error using a negative acknowledgment signal and may further inform some or all other cards within switching unit 10, such as all other receivers of message packet 50 or any other suitable collection of cards. The receiver may also replace word count word 62 with an appropriate status word on the receive side of the transmission, or may otherwise append a status word to message packet 50, to inform appropriate software within switching unit 10 of the status of the transmission. In one embodiment, the status associated with framing errors or the absence thereof may be "good," "framing error [local]," "framing error [remote]," or another appropriate status. Software, hardware, or any combination of software and hardware associated with switching unit 10 may be responsible for handling any such framing errors.

CRC word 66 is calculated and then appended to data packet 64 to complete message packet 50. In one embodiment, each receiver of message packet 50 calculates a check word as message packet 50 is received and compares the check word to the received CRC word 66. A mismatch indicates a data integrity error. Any receiver that discovers an error may inform at least the sender of message packet 50 using a negative acknowledgment signal and may also inform some or all other cards within switching unit 10, such as all other receivers of message packet 50 or any other suitable group of cards. The receiver may also replace CRC word 66 with an appropriate status word on the receive side of the transmission, or may otherwise append a status word to message packet 50, to inform appropriate software within switching unit 10 of the status of the transmission. In one embodiment, status associated with data integrity errors or the absence thereof may include "good," "data integrity error [local]," "data integrity error [remote]," or any other appropriate status. Software, hardware, or any combination of software and hardware associated with switching unit 10 may handle any such data integrity errors.

Figure 5A:
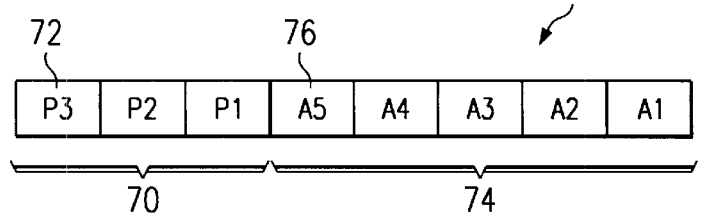
FIGS. 5A and 5B illustrate exemplary arbitration codes according to the present invention.
Figure 5B:
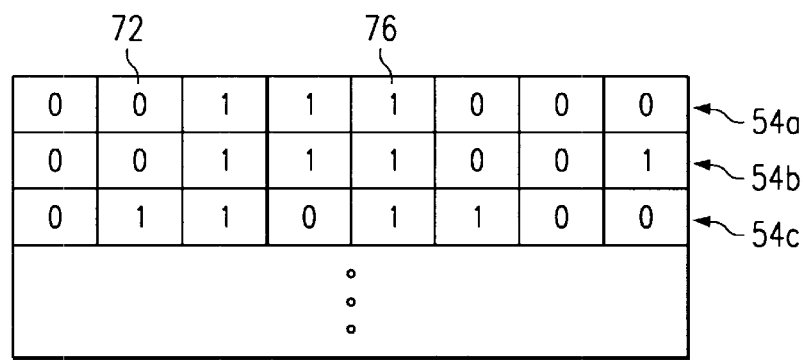

FIGS. 5A and 5B illustrate exemplary arbitration codes 54 according to the present invention. As shown in FIG. 5A, arbitration code 54 may include a priority code 70 that indicates the relative priority of message packet 50. In one embodiment, software associated with the sender of message packet 50 determines priority code 70, for each message packet 50, according to a predetermined priority scale. For example only and not by way of limitation, priority code 70 may be determined according to the following priority scale: (1) "status"—indicating message packet 50 may be transmitted without hurry, (2) "cycle acknowledgment"— indicating acknowledgment should be transmitted as soon as control bus 16 is free, (3) "service request"—indicating message packet 50 should be transmitted as soon as possible, and (4) "emergency request"— indicating message packet 50 should be transmitted in the next transfer cycle. Each priority level on the priority scale corresponds to a particular priority code 70 having a "0" or "1" bit value for each of one or more bit positions 72. Although four priority levels are discussed, the present invention contemplates any priority levels appropriate for the operation of switching unit 10. Furthermore, although priority code 70 is shown having three bit positions 72, allowing up to eight unique priority codes 70, the present invention contemplates priority code 70 of any suitable length to support any suitable number of unique priority codes 70.

Arbitration code 54 also contains sender address 74, which in one embodiment uniquely identifies the physical card slot of the sender within switching unit 10. Each bit position 76 within sender address 74 may have a "0" or "1" bit value, allowing up to thirty-two unique sender addresses 74 when sender address 74 has five bit positions 76. The present invention contemplates sender address 74 having any suitable length to support any suitable number of card slots. Sender address 74 may reflect a relative priority of the sender instead of or in addition to the card slot of the sender or may be determined based on physical location alone, for example, from one side of switching unit 10 to the other in descending order of priority. Sender address 74 for a particular sender may be permanent, in which case the sender must always remain at the same card slot within switching unit 10, or may be dynamically or otherwise modified to allow the sender to be placed in different card slots on different occasions according to particular needs. In one embodiment, controller 38 for the sender generates corresponding sender address 74 and appends priority code 70 to sender address 74 to form the complete arbitration code 54.

Switching unit controllers 12 and service providers 14 desiring to communicate message packet 50 using control bus 16 each use some or all of arbitration code 54 determine which competing sender will win the arbitration cycle corresponding to a particular transfer cycle and therefore be allowed to communicate message packet 50 within that transfer cycle. An arbitration cycle may begin any time control bus 16 is deemed idle, as discussed more fully below with reference to FIG. 7B. In one embodiment, an arbitration cycle is performed even if only one sender desires use of control bus 16. Within the arbitration cycle, the sender having the highest message priority according to priority code 70 is awarded use of control bus 16 for the associated transfer cycle. If multiple senders have message packet 50 with the same priority code 70, then control bus 16 is awarded to the sender having the highest physical priority according to sender address 74. A sender that has been awarded use of control bus 16 as a result of the arbitration cycle may be referred to as the bus master for the associated transfer cycle, while all other cards including any losing senders may be referred to as slaves for the transfer cycle.

Senders that lose during an arbitration cycle must wait for the next arbitration cycle to begin before re-arbitrating for the opportunity to use control bus 16. New sender requests are also added to the next arbitration cycle and, as discussed above, control bus 16 is awarded to the sender having the highest overall priority for message packet 50 according to associated arbitration code 54. The sender that wins the arbitration cycle may be prevented from winning the next or a later arbitration cycle if other senders are waiting to use control bus 16, thus preventing a particular sender from undesirably "hogging" or monopolizing control bus 16. A winning sender may be precluded from winning a later arbitration cycle within a specified number of transfer cycles of the arbitration cycle the sender won, according to particular needs.

Arbitration for use of control bus 16 is will be further described using a simple example. Those skilled in the art appreciate that other suitable arbitration scenarios may exist during operation of a telecommunications device and that the present invention encompasses all such scenarios. FIG. 5B illustrates arbitration codes 54a, 54b, and 54c for three senders competing for use of control bus 16 for a particular transfer cycle. In this example, a "0" bit value is deemed to have a higher priority than a "1" bit value, although the opposite or a more complex scheme may be employed without departing from the intended scope of the present invention. Each sender will drive or otherwise communicates onto control bus 16 the "0" or "1" bit value for the first bit position 72 within priority code 70 for its message packet 50. Each sender will then sample or otherwise examine control bus 16 and read back or otherwise determine the value of control bus 16, referred to herein as the network or bus value. In one embodiment, control bus 16 incorporates a "wired or" open collector arrangement, such that if any sender drives a "0" value all senders will read back a "0" bus value upon examining control bus 16. Conversely, only if all senders drive a "1" will the senders read back a "1" bus value upon examining control bus 16. In this example, all three senders will drive a "0" and read back a "0" based on their bit values for the first bit position 72 of priority code 70.

If a sender reads back a bus value different than the value the sender drove, the sender recognizes that it has lost the arbitration and must wait for the next arbitration cycle to again compete for use of control bus 16. Losing senders will not continue to participate in the particular arbitration cycle. In the alternative, if a sender reads back a bus value matching the value the sender drove, the sender recognizes that it has won or at least tied with one or more other senders for use of control bus 16 and may therefore need to compete with these senders based on the bit value of the next bit position within arbitration code 54. In one embodiment, although all but one sender may be eliminated before the arbitration cycle reaches the end of arbitration code 54, the arbitration cycle proceeds through the entirety of arbitration code 54, at which point only the winning sender or bus master will remain on control bus 16 and may transmit its message packet 50 using control bus 16.

Since in this example the bus value each sender read back matched the bit value each sender drove based on the first bit position 72, all three senders recognize that at least a tie has occurred and that the arbitration cycle must continue based on the bit values of the second bit positions 72 for their three arbitration codes 54. For the second bit position 72, the sender associated with arbitration code 54c drives a "1," reads back a "0," and recognizes that it has lost the arbitration cycle and must wait for the next arbitration cycle to re-arbitrate for use of control bus 16. The senders associated with arbitration codes 54a and 54b, however, each drive a "0," read back a "0," and recognize that at least a tie has occurred and that the arbitration cycle must continue based on the bit values of the third bit positions 72 for their arbitration codes 54. In this example, arbitration continues in this manner, through all three bit positions 72 of priority code 70 and all five bit positions 76 of sender address 74, before the sender associated with arbitration code 54a wins control bus 16 for the associated transfer cycle. In one embodiment, each sender captures arbitration code 54 for its message packet 50 in a holding register and serially shifts out each successive bit value as the arbitration cycle continues. At the completion of the arbitration cycle, based at least in part on each arbitration code 54 being unique since each sender address 74 is unique, only a single sender will remain on control bus 16 as bus master.

Figure 6:
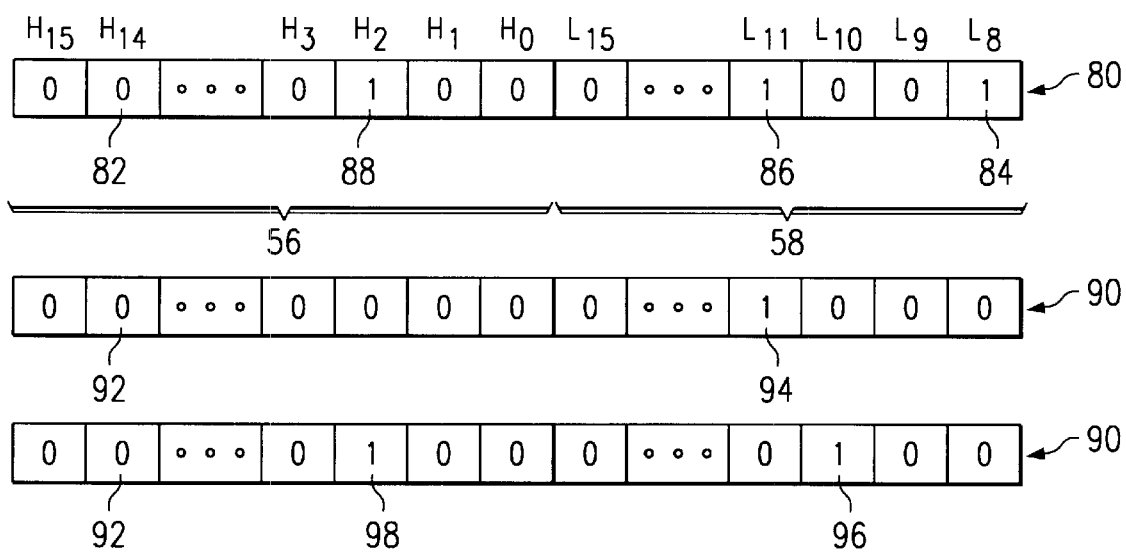
FIG. 6 illustrates exemplary destination and receive codes according to the present invention.

FIG. 6 illustrates an exemplary destination code 80 of message packet 50 including destination high word 56 and destination low block 58. The sender associated with message packet 50 uses destination code 80 to indicate one or more receivers for message packet 50. For purposes of clarity, the indices $H_i$ (i=0, 1, . . . 15) indicate the locations of the sixteen bits of destination high word 56 and the indices $L_i$ (i=8, 9, . . . 15) indicate the locations of the eight bits of destination low block 58. As discussed above, although destination code 80 is discussed as being twenty-four bits in length, destination code 80 may have any appropriate length according to particular needs. In one embodiment, since each bit position 82 within destination code 80 corresponds to a particular card slot within switching unit 10, and therefore to a particular switching unit controller 12 or service provider 14 associated with the particular card slot, destination code 80 should include a least as many bit positions 82 as there may be active cards during operation of switching unit 10. In one embodiment, a "1" value for a particular bit position 82 indicates that the slave associated with the bit position 82 will receive message packet 50, while a "0" value for a particular bit position 82 indicates that the slave may ignore message packet 50. Of course, "1" and "0" bit values may provide an opposite indication without departing from the intended scope of the present invention. For example only and not by way of limitation, exemplary destination code 80 shown in FIG. 6 indicates associated message block 50 is intended for receivers associated with bit positions 84, 86, and 88 located in the first, fourth, and eleventh card slots, respectively.

Exemplary first and second receive codes 90 associated with first and second receivers, respectively, are also shown in FIG. 6. In one embodiment, each of the receivers within switching unit 10 has a receive code 90 that may be pre-programmed or otherwise predetermined prior to or during initialization of switching unit 10, although the present invention contemplates changing one or more receive codes 90 dynamically or otherwise at any suitable time during the operation of switching unit 10. As with bit positions 82 of destination code 80, each bit position 92 within receive code 90 uniquely identifies a particular receiver within switching unit 10. A "1" bit value for a particular bit position 92 indicates the receiver associated with the bit position 92, for example, the card located in the associated card slot, is to receive message packets 50 intended for that receiver. Conversely, a "0" bit value for the particular bit position 92 indicates that the receiver associated with the bit position 92 may ignore message packets 50 intended for that receiver. Of course, the "1" and "0" bit values may provide opposite indications without departing from the intended scope of the present invention.

As an example only and not by way of limitation, the first receiver associated with first receive code 90 may be the receiver located in the fourth card slot. Since bit position 94 in first receive code 90 has a "1" bit value, while all other bit positions 92 in first receive code 90 have "0" bit values, first receive code 90 indicates its associated receiver is to receive all message packets 50 destined for the receiver in the fourth card slot and only those message packets 50. Bit position 94 may be referred to herein as the receive bit position for the receiver associated with first receive code 90 and its bit value may be referred to as the receive bit value. Upon receiving destination code 80 with message packet 50, the receiver will compare some or all of the bit values in its receive code 90, including at least its receive bit value, with some or all of the bit values in destination code 80, including at least the corresponding bit value for bit position 86, to determine whether the receiver is intended to receive the remainder of message packet 50 including data packet 64. If these bit values are both "1," as in this example, the receiver will receive at least data packet 64. If these values are not both "1," the receiver will discard the remainder of message packet 50 including data packet 64.

As the "1" bit values at bit positions 84, 86, and 88 in destination code 80 indicate, in this example message packet 50 is intended for receivers located in the first, fourth, and eleventh card slots. The number of bit positions 82 having "1" bit values may be a single bit position 82 for point-to-point communication of message packet 50 to a single receiver, multiple bit positions 82 for multi-cast communication of message packet 50 to multiple receivers, or all bit positions 82 for broadcast communication of message packet 50 to all receivers within switching unit 10. For example only and not by way of limitation, multi-cast transmission of at least some message packets 50 to selected service providers 14 may be desirable if some but not all service providers 14 are of a particular type and support different software than other service providers 14 within switching unit 10. Use of destination codes 80 and receive codes 90 to support dynamically determined point-to-point, multi-cast, or broadcast transmission of each particular message packet 50 within a backplane environment provides an important technical advantage over previous techniques. Among numerous other advantages over physical layer protocols such as Ethernet, control bus 16 and its associated protocol eliminate the need for message packets to pass through a hub on the way to their final destination.

The addressing structure described above also supports "bus snooping"—that is, the ability of a receiver to receive all message packets 50 destined for another specified receiver or group of receivers. As shown in FIG. 6, second receive code 90 has "1" bit values for bit positions 96 and 98, indicating that the second receiver is to receive all message packets 50 destined for receivers located in the third and eleventh card slots. In this example, the second receiver is located in the third card slot. Since destination code 80 has a "0" rather than a "1" bit value at bit position 82 corresponding to the third card slot, such that the corresponding bit values within destination code 80 and second receive code 90 are not both "1," the second receiver would not receive this particular message packet 50 but for the "1" bit value at bit position 98. In this example, the "1" bit value for bit position 98 allows the second receiver to receive message packets 50 destined for the receiver associated with the eleventh card slot. A receiver need not have its own receive bit set within its receive code 90 to receive message packets 50 destined for one or more other cards.

Because bus snooping allows one or more cards, one or more particular service providers 14 for example, to monitor message packets 50 destined for one or more other cards, destination codes 80 and receive codes 90 help support 1+1, N+1, N+X, and other suitable redundancy schemes often desirable in avoiding a single point of failure and satisfying high availability requirements. For example, receive code 90 for a redundant protection card 14 may be configured to allow the protection card 14 to snoop on or otherwise receive some or all message packets 50 destined for any protected cards 14 within a specified protection group. If one of the protected cards 14 fails, the protection card 14 may be informed of the failure and seamlessly assume at least some of the responsibilities of the failed protected card 14 until the failed protected card 14 can be replaced, repaired, or otherwise returned to service. One or more exemplary protection techniques involving bus 30 are described more fully in copending U.S. application Ser. No. 09/327,971.

Software within or otherwise associated with switching unit 10 may modify receive codes 90 for one or more receivers in any suitable manner during operation of switching unit 10, according to particular needs. For example, when a protection card 14 assumes some of the responsibilities of a failed protected card 14, protection card 14 may not be physically able to assume the responsibilities of any other failed or later failing protected cards 14 within its protection group. Protection card 14 may therefore not need to receive any message packets 50 destined for any of the formerly protected cards 14, at least until the failed protected card 14 is replaced, repaired, or otherwise resumes operation. The present invention contemplates modifying one or more receive codes 90 for any appropriate reason and at any time during the operation of switching unit 10.

FIGS. 7A and 7B illustrate exemplary transfer cycles 100 that each include an arbitration cycle (ARB) 102 in which a particular sender is deemed the master of control bus 16 for the associated transfer cycle 100, a data cycle (DATA) 104 in which data packet 64 and other suitable portions of message packet 50 are communicated from the master to one or more specified receivers using control bus 16, and a negative acknowledgment cycle (NACK) 106 in which one or more receivers may inform the master of errors occurring during communication of data packet 64 or other portions of message packet 50. Message packets 50 are compiled at each sender until they are complete. Message packets 50 are stored in associated transmit buffers 48 for these senders, associated controllers 38 are requested to transmit message packets 50, and controllers 38 arbitrate for use of control bus 16 in the manner described more fully above. Control bus 16 is always available for message traffic during the operation of switching unit 10 and arbitration cycle 102 may begin any time control bus 16 is considered idle as discussed more fully below. Message packets 50 from multiple senders are typically transmitted in back to back fashion over control bus 16, although control bus 16 may be idle between successive transfer cycles 100.

FIG. 7B is a timing diagram illustrating the assertion and de-assertion of signals on control bus 16 within a particular transfer cycle 100. In one embodiment, control bus 16 is a synchronous transfer bus with signals that are driven and sampled according to a common system clock. Senders drive all signals, both control and data signals, on the positive edge (the low to high transition) of the system clock. Receivers may sample all signals, both control and data signals, on the negative edge (the high to low transition) of the system clock, although any suitable sample position may be used according to bus speed and other factors, without departing from the intended scope of the present invention. Control bus 16 supports the following signals, in any appropriate combination, without limitation: (1) a system clock (SYS_CLK) signal 110, (2) a data bus (DATA[15:0]) signal 112, (3) a bus busy (BBSY*) signal 114, (4) a bus negative acknowledgment (BNACK*) signal 116, (5)

a bus error (BERR*) signal 118, (6) an arbitration (ARB*) signal 120, and (7) an arbitration bus (ARBUS) signal 122. Those skilled in the art will appreciate that it is possible to omit one or more of these signals without departing from the intended scope of the present invention.

SYS_CLK signal 110 is the common system clock that one or more switching unit controllers 12 drive during operation of switching unit 10 and that determines the timing of all transfers on control bus 16. In one embodiment, the clock is redundant, having an "A" and "B" pair, and software associated with switching unit 10 determines which "A" or "B" clock is to be used at any given time. In a particular embodiment, the clock operates at 8 MHz, although the present invention contemplates any appropriate clock speed. Preferably, each switching unit controller 12 and service provider 14 will use a self-generated clock that is phase and frequency locked to the system clock rather than using the system clock directly. One or more ASIC devices associated with each switching unit controller 12 and service provider 14 may be used to generate such a synchronized clock. Clock synchronization within switching unit 10 is described more fully in copending U.S. application Ser. No. 09/330,433. Exemplary ASIC devices capable of providing such clock synchronization are described more fully in copending U.S. application Ser. No. 09/330,433.

Data bus signal 112 is used to transfer data packets 64 from senders to one or more receivers within switching unit 10. Once a sender gains ownership of control bus 16 as a result of arbitration cycle 102, the sender drives the data words forming data packet 64 onto control bus 16 for a clock-by-clock (one data word per clock cycle) transfer of data packet 64 to its intended receivers. As discussed above, in accordance with the control bus protocol, the sender will drive the data words on the positive edge of the system clock and the receivers will sample the data words on the negative edge of the system clock. Data bus signal 112 is an output on the sender and is an input to all cards within switching unit 10, including the sender itself.

The sender that wins arbitration cycle 102 to become bus master asserts bus busy signal 114 to begin data cycle 104. In one embodiment, bus busy signal 114 is asserted one clock cycle prior to the first data word placed on data bus signal 112, between one and eight clock cycles after the last bit is shifted out of arbitration code 54. Bus busy signal 114 is de-asserted synchronous with CRC word 66, the last data word within message packet 50 to transfer, being placed onto control bus 16. Bus busy signal 114 is both an input and an output to all cards within switching unit 10 and in one embodiment has a driver of an open collector type.

A receiver asserts bus negative acknowledgment signal 116 at the completion of data cycle 104 if the receiver detects an error. Because control bus 16 allows for the multi-cast and broadcast messages in addition to point-to-point messages, a negative acknowledgment scheme is desirable since a typical positive acknowledgment scheme would be ineffective in such situations. A negative acknowledgment indicates that at least one of the receivers of message packet 50 has detected an error. No response indicates that no error has been detected. Because it is possible, although relatively unlikely, for a failure to occur that will not cause a negative response to be returned, indicating message packet 50 was successfully transmitted when in reality it was not, software associated with switching unit 10 may embed a positive acknowledgment into the message structure as in higher level protocols such as TCP/IP.

In one embodiment, errors that may cause a receiver to assert bus negative acknowledgment signal 116 include, without limitation: (1) a framing error as a result of which word count word 62 within message packet 50 does not match the number of words actually transmitted; (2) a CRC mismatch in which the CRC word 66 the sender calculates and transmits with message packet 50 does not match the CRC the receiver calculates; (3) a receive message lost error in which receive buffer 49 is full and not all of message packet 50 was properly stored; and (4) any other suitable error. More than one receiver may assert bus negative acknowledgment signal 116 with respect to a particular transfer cycle 100. In one embodiment, no indication as to the cause and source of the error may be available to the sender other than a notification that an error occurred according to bus negative acknowledgment signal 116.

In one embodiment, the sender and each receiver of message packet 50 sample bus negative acknowledgment signal 116 two complete cycles after CRC word 66 has been transmitted. This allows each receiver to report the message status to software associated with service provider 14 or to one or both of its associated switching unit controllers 12. Where the receiver is a switching unit controller 12 and switching unit 10 includes redundant switching unit controllers 12, the receiver may report the message status to all other switching unit controllers 12. The status may be that no error has been detected (BNACK* not asserted), that a local error has been detected (at the receiver), or that a remote error has been detected (at a different receiver). Software associated with switching unit 10 may respond to the error in any suitable manner based on particular needs and requirements. In one embodiment, bus negative acknowledgment signal 116 is both an input and an output to all cards and in one embodiment has a driver of an open collector type.

Switching unit controller 12 may assert bus error signal 118 if the associated control bus monitor detects a stuck bus condition, protocol violation, or other suitable error as described more fully below with reference to FIGS. 10 through 14. For example, a stuck bus condition may be detected if bus busy signal 114, bus negative acknowledgment signal 116, or arbitration signal 120 is asserted for too many clock cycles, for example and not by way of limitation, two consecutive clock cycles. Upon detecting that bus error signal 118 has been asserted for at least a specified number of clock cycles, for example and not by way of limitation, four consecutive clock cycles, switching unit controllers 12 and service providers 14 will reset their control bus logic, transmit buffers 48, and receive buffers 49 to reflect a switchover to the alternate redundant control bus 16. Bus error signal 118 is both an input and an output to all cards and may have a driver of an open collector type.

All senders desiring control bus 16 assert arbitration signal 120 at the start of arbitration cycle 102. As discussed above, arbitration cycle 102 may begin any time control bus 16 is idle. In one embodiment, an idle bus is defined as the condition in which bus busy signal 114, bus error signal 118, and arbitration signal 120 have each been sampled as de-asserted (high in one embodiment) for two consecutive samples. Each sender desiring control bus 16 may therefore assert arbitration signal 120 after sampling bus busy signal 114, bus error signal 118, and arbitration signal 120 as de-asserted on the two previous negative edges. If a sender desiring control bus 16 samples any of these signals as asserted (low in one embodiment), the sender must wait for the next arbitration cycle 102 to begin before asserting arbitration signal 120. Multiple senders may simultaneously assert arbitration signal 120. At the completion of a data cycle 104, if a sender desires use of control bus 16, it will detect bus idle and assert arbitration signal 120 to begin an arbitration cycle 102.

After one or more senders assert arbitration signal 120, all senders asserting arbitration signal 120 will begin to serially shift out the bits of the arbitration codes 54 for their message packets 50. Arbitration bus signal 122 is a single line used to serially shift out bits of arbitration code 54 during arbitration cycle 102. In one embodiment, a sender shifts out bits of arbitration code 54 first in time beginning one complete clock cycle after asserting arbitration signal 120. Although the bits of arbitration bus signal 122 are shown spanning one clock cycle each, the present invention contemplates each bit spanning multiple clock cycles, depending on bus speed and other suitable factors. Arbitration bus signal 122 is both an input and an output to all cards and may have a driver of an open collector type, such that multiple cards can drive control bus 16 at the same time.

Senders asserting arbitration signal 120 will sample arbitration bus signal 122 on each negative edge and compare the sampled data to their driven data. If the sampled and driven data match, the sender continues serially shifting out bits of arbitration code 54. However, if the sampled and driven data do not match, the sender ceases serially shifting out bits of arbitration code 54 and de-asserts arbitration signal 120 and arbitration bus signal 122 in recognition that it lost the arbitration. This process continues for successive bits until some or all bits of arbitration code 54 have been shifted out and a single sender remains on control bus 16 as bus master. Since message packet 50 for each sender includes a unique arbitration code 54, it is guaranteed that only a single bus master will remain on control bus 16 at the end of arbitration cycle 102 and may begin data cycle 104. In a particular embodiment, the master continues asserting arbitration signal 120 at least one clock cycle after it has asserted bus busy signal 114, up to a maximum of four clock cycles.

FIG. 8 is a flow chart illustrating an exemplary method of communicating message packet 50 from a sender to one or more receivers using control bus 16. The method begins at step 200, where the sender receives data packet 64, or information to be used to prepare data packet 64, in some suitable manner. As discussed above, this information may include a message packet associated with one or more higher level protocol layers. The sender determines priority code 70 for message packet 50 at step 202, according to input from software associated with the sender or in any other suitable manner, and identifies predetermined sender address 74 at step 204. The sender generates arbitration code 54 for message packet 50, including in one embodiment priority code 70 and sender address 74, at step 206 and generates destination code 80 for message packet 50 at step 208. At step 210, the sender appends an appropriate header, including in one embodiment at least arbitration code 54 and destination code 80, to data packet 64 to complete message packet 50. As discussed above, the header for message packet 50 may also include unused block 52, switching unit identifier 60, word count word 62, and any other suitable components. The sender may further append CRC word 66 to the end of data packet 64 to support appropriate error checking capabilities.

After determining that control bus 16 is idle or otherwise available at step 212, the sender asserts arbitration signal 120 at step 214 to begin arbitrating for use of control bus 16. The sender shifts out the first bit value of arbitration code 54 at step 216 using arbitration bus signal 122 and reads back or otherwise determines the bus value at step 218. If the driven value does not match the bus value at step 220, the sender recognizes that it has lost arbitration cycle 102, de-asserts arbitration signal 120 and arbitration bus signal 122 at step 222, and waits at step 224 for the next arbitration cycle 102 to begin. If the driven value matches the bus value at step 220 and the driven value was not the value of the last bit position of arbitration code 54 at step 226, the sender shifts out the next bit value of arbitration code 54 using arbitration bus signal 122 at step 228. The sender again determines the bus value at step 230 and the method returns to step 220, where the driven value is compared with the bus value. The method continues in this manner until a single sender remains on control bus 16.

If the driven value is the value for the last bit position of arbitration code 54 at step 226, in which case arbitration cycle 102 is completed and the sender is bus master, the sender asserts bus busy signal 114 to begin data cycle 104 at step 232 and then communicates message packet 50 or a portion thereof using data bus signal 112 at step 234. As discussed more fully above, destination code 80 identifies the one or more receivers of message packet 50 and supports dynamically determined point-to-point, multi-cast, or broadcast transmission of message packet 50. When the transmission of message packet 50 to one or more receivers is complete and data cycle 104 has been completed, the sender de-asserts bus busy signal 114 at step 236 and the method ends. The present invention contemplates some or all of these steps occurring for each message packet 50, even if only a single sender desires use of control bus 16 for a particular transfer cycle 100.

Figure 9:
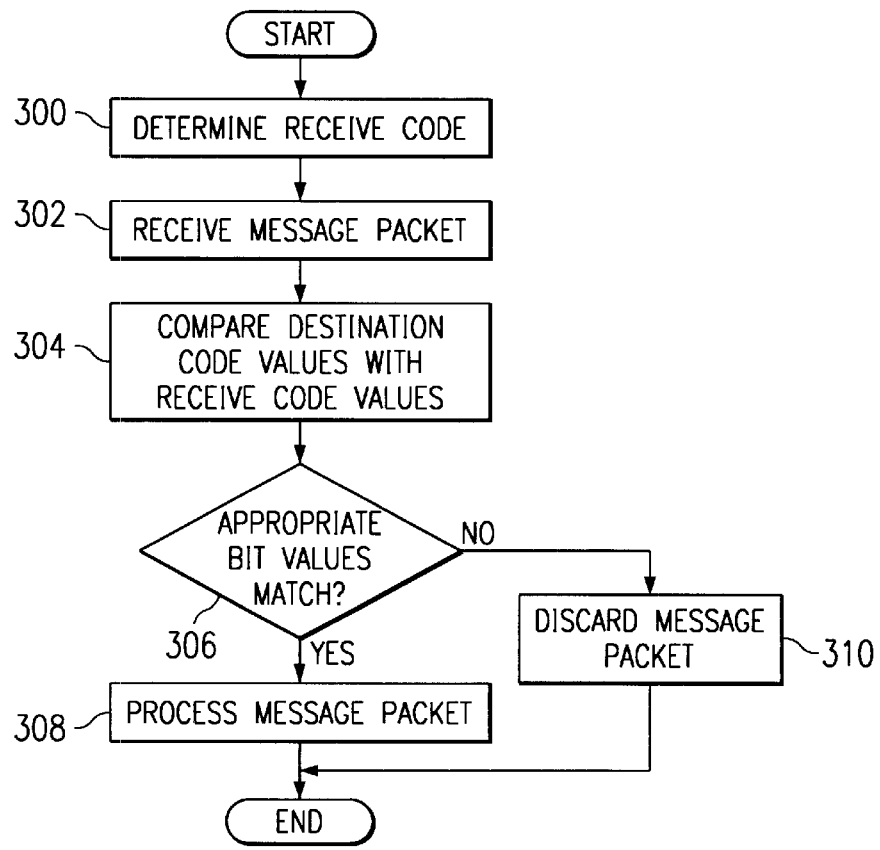
FIG. 9 is a flow chart illustrating an exemplary method of receiving a message packet according to the present invention.

FIG. 9 illustrates an exemplary method of receiving a particular message packet 50 communicated using control bus 16 according to the present invention. The method begins at step 300, where each of the slaves within switching unit 10 identifies its associated receive code 90, which as discussed above may indicate the slave is to receive all message packets 50 destined for receivers located at one or more card slots within switching unit 10. At step 302, if the slave is an intended receiver of message packet 50, the receiver will receive at least a portion of message packet 50 from the sender, including destination code 80 and data packet 64. At step 304, the receiver compares some or all of the bit values of bit positions 82 in destination code 80 with corresponding bit values of bit positions 92 in receive code 90 to determine whether the receiver was intended to receive data packet 64.

If one or more appropriate bit values in destination code 80 and receive code 90 match at step 306, in one embodiment both being "1" bit values, the receiver processes message packet 50 at step 306 as appropriate and the method ends. As discussed more filly above with reference to FIG. 6, the receiver may receive message packet 50 also destined for another receiver associated with another card slot according to a bus snooping mechanism instead of or in addition to receiving message packet 50 destined for its own card slot. Processing of message packet 50 may include comparison of a word count the receiver maintains to word count word 62, comparison of a CRC the receiver calculates to CRC word 66, or any other suitable error checking or other data processing operation. If the appropriate bit values in destination code 80 and receive code 90 do not match at step 306, the receiver discards or otherwise ignores message packet 50 at step 310 and the method ends.

FIG. 10 illustrates exemplary control bus monitors 130 and selected related components. To provide redundancy, helping to avoid a single point of failure and to satisfy high availability requirements, each switching unit controller 12 may include an associated control bus monitor 130. The present invention contemplates using a single control bus monitor 130 for switching unit 10. Monitors 130 are each coupled to both of the redundant "A" and "B" control buses 16 using an associated multiplexer 132. Unless otherwise specified, references to control bus 16 are intended to include "A" control bus 16, "B" control bus 16, or both "A" and "B" control buses 16 as appropriate. In general, monitors 130 independently monitor control bus 16 for one or more error conditions that may arise during transfer cycles 100. In one embodiment, such errors may include, without limitation: (1) errors detected while control bus 16 is in an idle state and not carrying any particular message packet 50, (2) errors associated with shifting out bit values of arbitration code 54 during arbitration cycle 102, (3) errors associated with de-assertion of arbitration signal 120, (4) errors associated with de-assertion of bus busy signal 114, (5) errors detected during bus inactivity analysis, and (6) any other suitable error conditions.

Assume for purposes of this description that switching unit controllers 12 and service providers 14 are using "A" control bus 16 to communicate with one another and that both monitors 130 independently determine that "A" control bus 16 has failed, is stuck, or is otherwise experiencing an error condition. Monitors 130 will inform one another using network 18, data network 29, or in any other suitable manner, deem "A" control bus 16 at least temporarily failed, and initiate a switchover to "B" control bus 16 that affects all switching unit controllers 12 and service providers 14 within switching unit 10. To this end, one or both switching unit controllers 12 command or otherwise inform service providers 14 concerning the switchover using selection bus 28, all cards begin using "B" control bus 16 rather than "A" control bus 16, and operation of switching unit 10 continues. In one embodiment, the switchover may be more or less seamless, such that switching unit 10 experiences little or no degradation in performance, capacity, or other characteristics resulting from the failure of "A" control bus 16 and the switchover to "B" control bus 16.

Alternatively, if one monitor 130 determines that "A" control bus 16 has failed, is stuck, or is otherwise experiencing an error condition, but the other monitor 130 does not, the switching unit controller 12 associated with one of the monitors 130 may be experiencing a failure of its own. For example, a first monitor 130 within a failing switching unit controller 12 might detect a failure of control bus 16 when in reality control bus 16 has experienced no such failure. In this situation, monitors 130 will use network 18, data network 29, or another suitable mechanism to communicate with one another regarding the failure status of control bus 16. In one embodiment, the second monitor 130 that did not detect the failure sends a test signal over "A" control bus 16 to attempt to confirm the failure analysis of first monitor 130. If a proper result is not obtained in response to the test signal, confirming that control bus 16 is indeed not functioning properly, second monitor 130 informs first monitor 130 of its confirmation and monitors 130 cooperate to initiate a switchover to "B" control bus 16.

If a proper result is obtained in response to the test signal, however, indicating that control bus 16 is functioning properly but that first monitor 130 is not functioning properly, second monitor 130 informs software within switching unit 10 of the situation. In response, the software may isolate or otherwise remove from service the switching unit controller 12 associated with first monitor 130 until it can be replaced, repaired, or otherwise returned to service. The present invention therefore reduces or eliminates unnecessary switchovers from one redundant control bus 16 to the other, providing an important technical advantage. Furthermore, allowing "voting" between two redundant monitors 130 to determine whether switchover is necessary or otherwise desirable, with or without attempted verification according to the test signal from one of the monitors 130, provides an important technical advantage over previous techniques involving voting schemes.

FIG. 11 illustrates in further detail exemplary control bus monitors 130. Assuming again for purposes of this description that switching unit controllers 12 and service providers 14 are using "A" control bus 16 to communicate, both monitors 130 will have previously driven associated selection logic 134 for "A" control bus 16 to a common value, either low or high according to the particular implementation, to in essence turn on "A" control bus 16, and will have previously driven selection logic 136 for "B" control bus 16 to a common but opposite value, high or low according to the particular implementation, to in essence turn off "B" control bus 16. By driving the values of selection logic 134 or 136, monitors 130 command or otherwise inform the cards within switching unit 10 to use a particular one of the redundant "A" and "B" control buses 16. In response to a confirmed failure of "A" control bus 16, however, based either on independent detection or on the result of the voting procedure described above in connection with data network 29, monitors 130 drive selection logic 134 and 136 to their opposite values. As a result, using selection bus 28, monitors 130 in essence turn off "A" control bus 16, turn on "B" control bus 16, and command or otherwise inform all cards regarding the switchover to "B" control bus 16.

FIG. 12 illustrates an exemplary control bus selection state table 140 that contains four possible states 142, 144, 146, and 148 associated with selection logic 134 and 136 for two control bus monitors 130. Column "A" indicates the state of selection logic 134 for states 142, 144, 146, and 148. Column "B" indicates the states of selection logic 136 for states 142, 144, 146, and 148. In one embodiment, a "0" state of selection logic 134 or 136 corresponds to selection logic 134 or 136 in both monitors 130 being turned on or otherwise having selected "A" or "B" control bus 16, respectively, during operation of switching unit 10. Conversely, a "1" state of selection logic 134 or 136 corresponds to selection logic 134 or 136 in both monitors 130 being turned off or otherwise having selected "B" or "A" control bus 16, respectively. An opposite scheme for state values may of course be used without departing from the scope of the present invention.

During operation of switching unit 10, at least in one embodiment, one and only one of the redundant "A" and "B" control buses 16 may be in use at any given time. Therefore, regardless of whether a "0" in table 140 indicates a particular control bus 16 is in use or, alternatively, is not in use, states 144 and 146 are valid and states 142 and 148 are invalid. Transition of control bus 16 from a valid state 144 or 146 to an invalid state 142 or 148 during operation of switching unit 10 indicates a failure of selection logic 134 or 136 within at least one of the monitors 130. In one embodiment, switching unit controllers 12 and service providers 14 each include functionality to detect invalid state transitions in response to switching unit controllers 12 communicating bit values corresponding to selection states 142, 144, 146, or 148. For example, for transition from valid state 144 to invalid state 148, two "1" bit values may be communicated such that both switching unit controllers 12 and all service providers 14 are made aware of the invalid state transition. In response to a transition to invalid state 142 or 148, switching unit controllers 12 and service providers 14 continue using the current control bus 16, "A" control bus 16 for example. Software, hardware, or any suitable combination of software and hardware within or associated with one or more switching unit controllers 12 or monitors 130 may be responsible for responding to and handling failed selection logic 134 or 136. Alternatively, at least one switching unit controller 12 or associated monitor 130 may need to be physically replaced, repaired, or suitably modified before returning to service.

Figure 13:
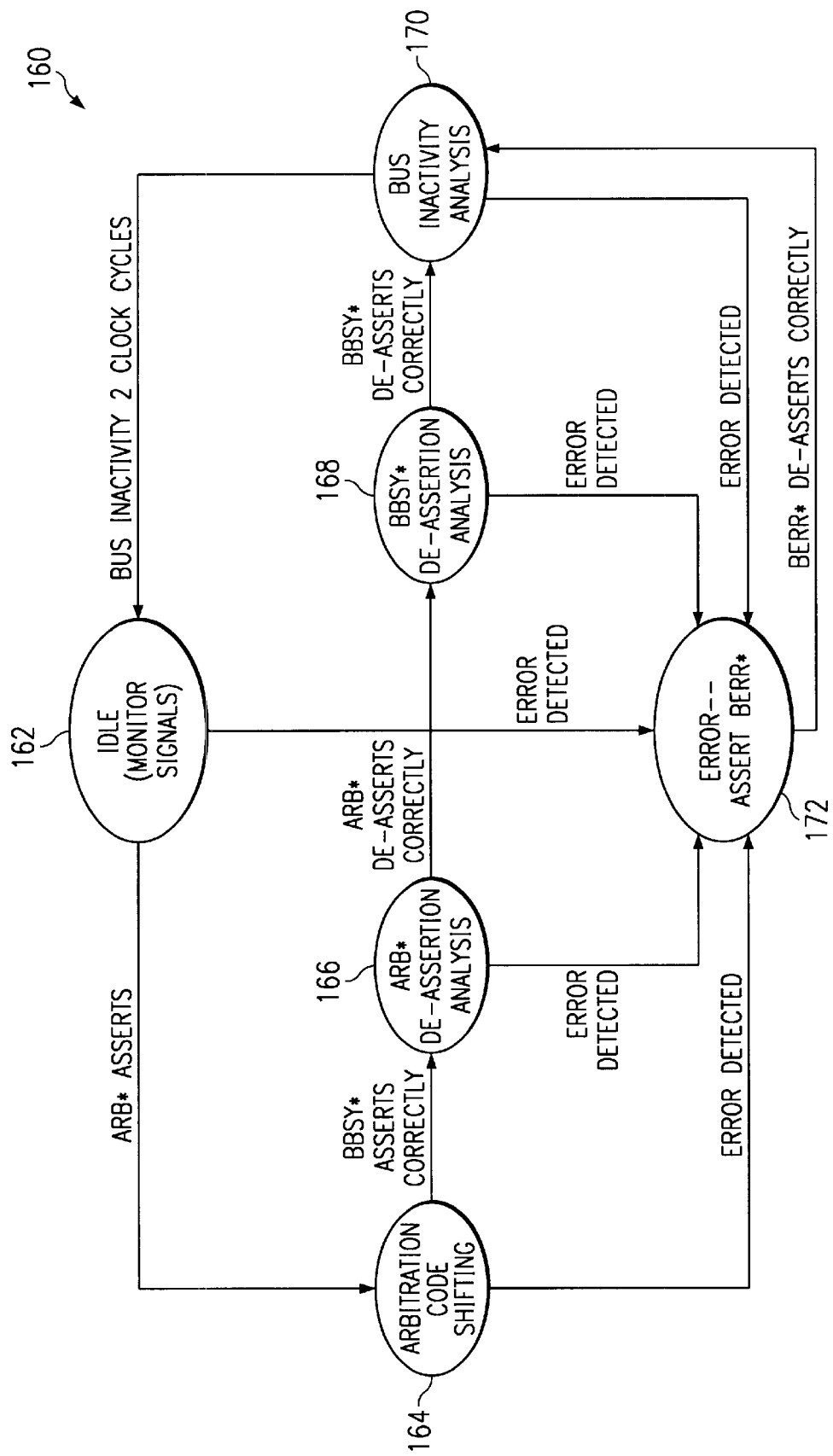
FIG. 13 is an exemplary state diagram for a control bus monitor.

FIG. 13 is an exemplary state diagram 160 for a particular control bus monitor 130 illustrating some or all possible states and state transitions associated with a particular transfer cycle 100. Those skilled in the art appreciate that other suitable states and state transitions may be associated with the operation of switching unit 10 without departing from the intended scope of the present invention. In one embodiment, the states of transfer cycle 100 should progress from idle state 162 to arbitration code shifting state 164 through assertion of arbitration signal 120. State 164 should transition to arbitration signal de-assertion analysis state 166 through assertion of bus busy signal 114. State 166 should transition to bus busy signal de-assertion analysis state 168 through the de-assertion of arbitration signal 120. State 168 should transition to bus inactivity analysis state 170 through de-assertion of bus busy signal 114. Finally, to complete transfer cycle 100, state 170 should transition to idle state 162 through the inactivity of control bus 16 for two consecutive clock cycles or based on any other suitable inactivity measure. Monitor 130 monitors the signals on control bus 16 for validity while in idle state 162. Any of these states may transition to error state 172, at which bus error signal 118 is asserted, through detection of an error, for example, the assertion or de-assertion of a signal other than in the desired sequence. Once the error condition is resolved in some suitable manner, monitor 130 notifies software associated with its switching unit controller 12 and state 172 transitions to bus inactivity analysis state 170 through the de-assertion of bus error signal 118.

FIG. 14 is a flow chart illustrating an exemplary method of monitoring a local area network according to the present invention. The method begins at step 400, where some or all switching unit controllers 12 and service providers 14 within switching unit 10 communicate using "A" control bus 16. Selection of "A" control bus 16 is for purposes of convenience only and does not limit the present invention in any manner. Selection of a particular redundant "A" or "B" control bus 16 may be performed in any suitable manner prior to or at initialization of switching unit 10. If a first control bus monitor 130 detects a failure of "A" control bus 16 at step 402, the first monitor 130 informs a second monitor 130 using network 18, data network 29, or another suitable mechanism at step 404. First monitor 130 may be either of the two redundant monitors 130, with second monitor 130 being the other redundant monitor 130. If second monitor 130 also independently detects the failure at step 406, essentially confirming that "A" control bus 16 has failed, second monitor 130 informs first monitor 130 using data network 29 at step 407, and associated switching unit controllers 12 initiate a switchover to "B" control bus 16 at step 408. To do so, switching unit controllers 12 drive selection logic 134 and 136 to their opposite values at step 410, transitioning selection logic 134 and 136 from state 144 to state 146 or from state 146 to state 144 depending on the particular implementation, and instruct service providers 14 to use "B" control bus 16 at step 412 using selection bus 28. In response, switching unit controllers 12 and service providers 14 begin communicating using "B" control bus 16 at step 414, and the method ends.

If second monitor 130 does not also independently detect the failure of "A" control bus 16 at step 406, second monitor 130 sends a test signal over "A" control bus 16 at step 416 to attempt to confirm the failure analysis of first monitor 130. If a proper result is not obtained at step 418 as a result of the test signal, indicating that "A" control bus 16 is indeed not functioning properly, second monitor 130 informs first monitor 130 of its confirmation at step 420 using network 18, data network 29, or another suitable mechanism and the method returns to step 408, where switching unit controllers 12 initiate a switchover to "B" control bus 16. If a proper result is obtain at step 418 as a result of the test signal, however, indicating that "A" control bus 16 is functioning properly but that first monitor 130 is not functioning properly, second monitor 130 informs software within switching unit 10 at step 422. In response, the software isolates first monitor 130 at step 424, using isolation bus 27 for example, until it can be replaced, repaired, or otherwise returned to service, and the method ends.

If neither monitor 130 detects a failure of "A" control bus 16 at step 402, and selection logic 134 and 136 has not transitioned from a valid state 144 or 146 to an invalid state 142 or 148 at step 426, the method returns to step 400, where switching unit controllers 12 and service providers 14 continue to communicate using "A" control bus 16. However, if selection logic 134 or 136 has transitioned from a valid state 144 or 146 to an invalid state 142 or 148 at step 426, indicating a failure of selection logic 134 or 136 within at least one monitor 130, then switching unit controllers 12 maintain the previous valid state 144 or 146 at step 428, inform appropriate software associated with switching unit 10 of the invalid transition at step 430, and the method ends.

As the above description indicates, the present invention provides a local area network that, in one embodiment, provides high availability suitable for operation within a backplane environment of switching unit 10 or another suitable telecommunications device. The present invention provides multiple layers of fault protection with respect to control bus 16, helping to avoid single points of failure, to satisfy high availability requirements, and to provide a number of important technical advantages over prior techniques. In one embodiment, layers of fault protection include, in any combination and without limitation: (1) providing hot insertable, hot pluggable, hot swappable, or otherwise readily replaceable switching unit controllers 12 and service providers 14; (2) providing redundant control buses 16, switching unit controllers 12, monitors 130, and selected related components; (3) providing monitors 130 that independently monitor control bus 16; (4) providing the ability to confirm the failure analysis of one monitor 130; (5) providing a strategy to handle invalid state transitions of selection logic within monitors 130; and (6) any other fault protection layers described herein or made readily appreciable to those skilled in the art.

Although the present invention has been described with several embodiments, a plethora of changes, substitutions, variations, alterations, and modifications may be suggested to one skilled in the art, and it is intended that the invention encompass all such changes, substitutions, variations, alterations, and modifications as fall within the spirit and scope of the appended claims.

What is claimed is:

1. A telecommunications device, comprising:
   a local area network comprising redundant first and second control buses operable to communicate control data;

a plurality of cards coupled to the first and second control buses, the cards operable to communicate control data using the first control bus;

a data network operable to communicate non-control telecommunications data between the cards;

a first monitor coupled to the first and second control buses and to the data network, the first monitor operable to detect a failure of the first control bus and to communicate a message indicating the failure using the data network;

a second monitor coupled to the first and second control buses and to the data network, the second monitor operable to detect the failure of the first control bus and to communicate a message indicating the failure using the data network; and the first monitor operable to receive the message from the second monitor and the second monitor operable to receive the message from the first monitor, the monitors operable to cause the cards to communicate control data using the second control bus in response to the messages.

2. The device of claim 1, wherein the device comprises a switching unit having a high availability backplane environment.

3. The device of claim 1, wherein the second monitor is operable to transmit a test signal using the first control bus in response to the message from the first monitor if the second monitor has not detected the failure of the first control bus.

4. The device of claim 3, wherein the second monitor is operable to communicate the message to the first monitor in response to an improper test signal result.

5. The device of claim 3, wherein the device is operable to isolate the first monitor in response to a proper test signal result.

6. The device of claim 1, wherein the first monitor comprises first selection logic for the first control bus and second selection logic for the second control bus, the first selection logic having a first value and the second selection logic having a second value during operation of the device, the first monitor operable to drive the second value to the first value in response to the message from the second monitor.

7. The device of claim 6, further comprising a selection bus coupled to the cards, to the first selection logic, and to the second selection logic, the selection bus indicating to the cards to communicate using the second control bus in response to the second value being driven to the first value.

8. The device of claim 6, wherein the second monitor comprises first selection logic for the first control bus and second selection logic for the second control bus, the first selection logic for the second monitor having the first value and the second selection logic for the second monitor having the second value, the second monitor operable to drive the second value of its second selection logic to the first value, the device operable to isolate the second monitor if the first monitor does not also drive the second value of its second selection logic to the first value.

9. The device of claim 1, wherein:

the first monitor comprises first selection logic for the first control bus having a first value and second selection logic for the second control bus having a second value, the first and second values determining a selection state; and each of the plurality of cards is operable to detect an invalid transition from the selection state.

10. A monitor for monitoring a local area network in a telecommunications device comprising a plurality of cards coupled to one another using a data network operable to communicate non-control telecommunications data between the cards, the local area network comprising redundant first and second control buses coupling the cards, the cards operable to communicate using the first control bus, the monitor operable to:

receive a message from a second monitor communicated using the data network and indicating a failure of the first control bus;

if the monitor has detected the failure, communicating a message to the second monitor using the data network to indicate the failure; and if the monitor has not detected the failure,
transmitting a test signal using the first control bus in response to the message from the second monitor, and
detecting a test signal result.

11. The monitor of claim 10, wherein the device comprises a switching unit having a high availability backplane environment.

12. The monitor of claim 10, wherein the monitor is operable to communicate a message to the second monitor using the data network to indicate the failure if the test signal result is an improper test signal result.

13. The monitor of claim 10, wherein the monitor is operable to cause the second monitor to be isolated if the test signal result is a proper test signal result.

14. A method of monitoring a local area network in a telecommunications device comprising a plurality of cards coupled to one another using a data network operable to communicate non-control telecommunications data between the cards, the local area network comprising redundant first and second control buses coupling the cards, the method comprising:

communicating between cards using the first control bus;

detecting a failure of the first control bus using a first monitor;

communicating a first message from the first monitor to a second monitor using the data network to indicate the failure;

receiving the first message at the second monitor;

if the second monitor has detected the failure, communicating a second message from the second monitor to the first monitor using the data network to indicate the failure;

receiving the second message at the first monitor; and causing the cards to communicate using the second control bus in response to the first and second messages.

15. The method of claim 14, wherein the device comprises a switching unit having a high availability backplane environment.

16. The method of claim 14, further comprising, if the second monitor has not detected the failure, transmitting a test signal from the second monitor using the first control bus in response to the first message.

17. The method of claim 16, further comprising:

detecting an improper test signal result; and communicating the second message from the second monitor to the first monitor to indicate the failure in response to the improper test signal result.

18. The method of claim 16, further comprising:

detecting a proper test signal result; and isolating the first monitor in response to the proper test signal result.

19. The method of claim 14, further comprising:

driving first selection logic in the first monitor and corresponding to the first control bus from a first value to a second value in response to the second message; and driving second selection logic in the first monitor and corresponding to the second control bus from the second value to the first value in response to the second message.

20. The method of claim 19, further comprising, in response to the second value being driven to the first value and using a selection bus that is coupled to the cards, to the first selection logic, and to the second selection logic, indicating to the cards to communicate using the second control bus.

21. The method of claim 19, further comprising isolating the first monitor in response to driving the second selection logic from the second value to the first value if second selection logic in the second monitor and corresponding to the second control bus is not also driven from the second value to the first value.

22. The method of claim 14, further comprising:

determining a selection state at the first monitor, the selection state determined according to a first value that is associated with first selection logic for the first control bus and a second value that is associated with second selection logic for the second control bus;

transitioning from the selection state at the first monitor; and detecting, at each of the plurality of cards, an invalid transition from the selection state.

* * * * *